United States Patent Office 2,745,849
Patented May 15, 1956

2,745,849

METHOD OF PURIFYING BILE ACIDS

Merlyn W. Fogle, Joliet, Ill., assignor to Armour and Company, Chicago, Ill., a corporation of Illinois No Drawing. Application June 14, 1954,
Serial No. 436,689

9 Claims. (Cl. 260—397.1)

This invention relates to a process for purifying crude bile acids, and more particularly to a method of separating hyodesoxycholic acid from a mixture of crude bile acids.

Bile acids, which are generically described as cholic acids, are obtained from the bile substance of animal gall bladders. These acids have been employed widely as intermediate products in the synthesis of various steroid substances, and the production thereof is of considerable commercial significance.

Therefore, the need for more efficient and practical methods of purifying the bile acids is of increasing importance.

There are several known methods for purifying the cholic acids of bile materials. One of the more important of these procedures involves the treatment of bile with precipitating agents such as salts or solvents in order to render insoluble the conjugated bile acids. After separation, the conjugated acids are subjected to saponification to provide the free bile acids. The free acids are separated from the solution by precipitation with acid. The free acids may then be subjected to various purification procedures to yield the hyodesoxycholic acid. This acid is further purified and crystallized, and is employed as a starting material for various synthetic processes to obtain several steroid substances.

This method, although of greater significance than other procedures in the art, is undesirable in that it is a lengthy and tedious process yielding only a fraction of the hyodesoxycholic acid available in bile.

I have discovered a method of separating hyodesoxycholic acid from bile material in yields so high as to be heretofore considered impossible.

One feature of my novel process involves the separation of hyodesoxycholic acid from a free bile acid mixture by combining a bile acid mixture, which includes hyodesoxycholic acid esters, with a low-boiling organic solvent to form a crystalline complex of the solvent and the hyodesoxycholic acid esters. This crystalline complex can be separated from the residual bile acids to provide an hyodesoxycholic acid product of substantial purity.

In preparing the bile acid mixture employed in my method, it is desirable to subject a bile material to an alkaline hydrolysis to convert the conjugated bile acids to free bile acids. This step may be accomplished suitably by saponifying the bile material, i.e. by heating such material in an alkaline medium.

The hyodesoxycholic acid esters may be produced from the alkaline hydrolyzed bile material, containing a mixture of bile acids, by reacting such material with an aliphatic alcohol having less than 4 carbon atoms. Especially desirable results are obtained when the bile acid mixture is reacted with ethyl alcohol or methyl alcohol.

In the preferred practice, the free bile acids are separated from the alkaline hydrolyzed crude bile material by precipitation with acid, and then treated with the aliphatic alcohol to provide an esterified bile acid mixture. The precipitated bile acid mixture contains approximately 25% hyodesoxycholic acid, by weight. The residuum of the mixture includes beta-hyodesoxycholic acid, 3-beta-hydroxy-6-keto-all-cholanic acid, and a large portion of unidentified bile acids and related substances.

The concentration of alcohol in the esterification reaction mixture may be varied widely. However, the reaction is inhibited to a certain degree when such mixture contains a large percentage of water. Thus, it is desirable to either dry the crude bile precipitate or to add an excess volume of alcohol in order to substantially dehydrate the mixture.

The temperature and pressure of the esterification reaction may be varied widely without measurably affecting the reactivity of the constituents thereof.

In practicing my novel method of separating hyodesoxycholic acid from a mixture of bile acids, the free bile acid mixture is combined with a low-boiling organic solvent. Preferably, such solvents as toluene, carbon tetrachloride, and benzene are employed. Exceptionally good results are obtained when benzene is utilized as the crystallizing solvent.

The esterified bile acid mixture may be combined with the organic solvent directly after the esterification step. However, it is desirable to render the esterified bile acids substantially free of the lower aliphatic alcohol prior to crystallization. The excess alcohol, if permitted to remain during the crystallization operation, will act to inhibit the crystal-complex formulation to some extent, although the reaction will proceed suitably at a retarded rate. The removal of the alcohol may be effected, for example, by washing the alcohol-treated bile acid mixture with water. The washed mixture may then be dried by distillation, whereby at least a portion of such liquids are removed as an alcohol-water azeotrope.

The solvent may be combined with the bile acid mixture by several methods, for example, by agitation, pumping, or churning. By this action the esterified hyodesoxycholic acid is complexed with the solvent to form a crystalline substance.

The crystalline complex can be separated from the mother liquors to provide an hyodesoxycholic acid product of substantial purity. The separation of the crystals from the effluent phase may be accomplished by several methods, such as decantation, centrifugation and filtration.

The ratio of organic solvent to the bile acid mixture can be varied widely and, if desired, the organic solvent phase may be treated with a solution of mild alkali prior to crystallization in order to neutralize the crude bile acid mixture.

The novel method of this invention is further illustrated by the following specific examples.

*Example I*

To 1000 gallons (about 8500 lbs.) of hog bile was added 850 lbs. of dry sodium hydroxide pellets (the alkali has also been added in the amount of 1700 lbs. of a 50% aqueous solution of sodium hydroxide). The alkaline bile material was saponified by heating in an autoclave for 16 hours at a pressure of 20 p. s. i. g. Sulfuric acid was added to the saponified bile to adjust the pH thereof to about 7 to 8. Filteraid and 200 to 300 gallons of water were then added. The material was heated to about 50° C., filtered, and acidified while still "hot." 100 gallons of benzene was added to "float" the acids, and the brine or liquid residuum was drained off through a sewer. The benzene was removed by distillation, further benzene being added during distillation in order to dehydrate the bile acids.

To the dried acids was added 250 gallons of absolute methanol and 1.25 gallons of hydrochloric acid. This mixture was refluxed for three hours. 350 gallons of benzene and 500 gallons of water were added to the refluxed mixture. This suspension was agitated, and the benzene phase separated by centrifugation. The precipitate was washed in a 3% solution of sodium bicarbonate. The washed benzene phase was concentrated to about 200 gallons by distillation, and the solution was allowed to crystallize by standing at room temperature. The crystal suspension was centrifuged, and the crystals washed with benzene and air dried.

The yield of methyl hyodesoxycholanate-benzene complex was about 135 to 140 lbs., of which approximately 16% amounted to benzene.

*Example II*

Two liters of hog bile were saponified by adding 400 gms. of 50% commercial caustic and the resulting solution refluxed 24 hours. After saponification the pH was brought to about 7.5 by adding hydrochloric acid and the solution filtered, using filter-aid and some additional water to speed the filtration.

The filtrate was heated to 50° C., then acidified to a pH of 2–3, and finally heated to 70° C. The gummy, non-crystalline acids floated and were separated by siphoning off the brine or water layer. These crude acids thus obtained were washed with water by decanting, then dissolved in a solution of 200 ml. methanol and 200 ml. of benzene. The resulting solution was transferred to a still and the solvents removed by distillation. An additional 100 ml. of benzene was added and removed as before, to dry the acids.

500 ml. of methanol was added and the solution neutralized with hydrochloric acid. 5 ml. excess of hydrochloric acid was added and the solution refluxed 4 hours. When the solution had cooled slightly 500 ml. of benzene was added and the resulting solution washed with 1000 ml. of water. The aqueous layer was discarded. The benzene solution was concentrated to 300 and 400 ml. and allowed to stand overnight. The methyl hyodesoxycholanate crystallized with one molecule of benzene. Yields were 25 to 30 gms. 5 gm. of the above ester was dissolved in methanol and saponified by heating with an excess of caustic. After acidification the alcohol was boiled off. The acid thus obtained melted at 195 to 198° C. Yield: 4.5 gms.

Acetylation of the above methyl ester gave the 3,6-diacetoxy derivative melting at 98 to 100° C.

*Example III*

5 grams of purified and dehydrated hyodesoxycholic acid (see Example II, supra) was dissolved in about 50 ml. of methanol. A few drops of hydrochloric acid was added, and the solution refluxed for one hour. Then 50 cc. of toluene was added, and the methanol removed by washing the solvent mixture several times with water. After removing a small portion of the solvent by distillation, the mixture was cooled providing crystals of the methyl hyodesoxycholate toluene complex.

*Example IV*

The carbon tetrachloride complex of methyl hyodesoxycholate was prepared by substituting carbon tetrachloride for toluene in the method of Example III.

The average yields obtained from the practice of my improved process have been about 1.2 to 1.5% hydesoxycholic acid of the crude bile substance.

Instead of methanol, employed in the above examples, ethanol or propanol can be substituted.

While in the foregoing specification the novel method of this invention has been described in considerable detail by reference to specific embodiments thereof, it will be apparent to those skilled in the art that the invention is susceptible to other embodiments and that many of the details set forth can be varied widely without departing from the basic concepts of the invention.

I claim:
1. In a method of separating hyodesoxycholic acid from a bile acid mixture, which mixture includes hyodesoxycholic acid esters, said esters being alkyl groups having less than 4 carbon atoms, the steps of combining said mixture with an organic solvent of the group consisting of carbon tetrachloride, toluene, and benzene, whereby a crystalline complex of said solvent and the hyodesoxycholic acid esters is formed, and separating the crystalline complex from the liquid residuum.

2. In the method of obtaining hyodesoxycholic acid from bile material, the steps of subjecting said material to an alkaline hydrolysis to provide a free bile acid mixture, contacting said mixture with an aliphatic alcohol having less than 4 carbon atoms to esterify said mixture, combining the esterified mixture with an organic solvent of the group consisting of carbon tetrachloride, toluene, and benzene, whereby a crystalline complex of said solvent and the hyodesoxycholic acid ester is formed, and separating the crystalline complex from the liquid residuum.

3. In a method of obtaining hyodesoxycholic acid from bile material, the steps of subjecting said material to an alkaline hydrolysis to provide a free bile acid mixture, contacting said mixture with an aliphatic alcohol having less than 4 carbon atoms, combining the alcohol-treated mixture with an organic solvent of the group consisting of toluene, carbon tetrachloride and benzene, whereby a crystalline complex of said solvent and the hyodesoxycholic acid ester is formed, and separating the crystalline complex from the liquid residuum.

4. The method of claim 3 in which said aliphatic alcohol is ethyl alcohol.

5. In a method of separating hyodesoxycholic acid from an alkaline hydrolyzed bile material, the steps of contacting said material with methyl alcohol to provide a bile acid mixture containing methyl hyodesoxycholate, combining said mixture with an organic solvent of the group consisting of carbon tetrachloride, toluene, and benzene, whereby a crystalline complex of said solvent and methyl hyodesoxycholate is formed, and separating the crystalline complex from the liquid residuum.

6. In a method of separating hyodesoxycholic acid from a bile acid mixture, the steps of contacting said mixture with an aliphatic alcohol having less than 4 carbon atoms to provide in said mixture alkyl hyodesoxycholate under substantially anhydrous conditions, separating said alcohol from said mixture, combining the alcohol-treated mixture with an organic solvent of the group consisting of carbon tetrachloride, toluene, and benzene, whereby a crystalline complex of said solvent and the alkyl hyodesoxycholate is formed, and separating the crystalline complex from the liquid residuum.

7. In a process for separating hyodesoxycholic acid from bile, wherein bile is subjected to an alkaline hydrolysis to produce a mixture of free bile acids and then treated with acid to obtain a precipitate of the bile acid mixture, the steps of contacting said precipitate with an aliphatic alcohol containing less than 4 carbon atoms to esterify said bile acid mixture, combining the esterified bile acid mixture with benzene, whereby a crystalline complex of hyodesoxycholic acid ester and benzene is formed, and separating said crystalline complex from the liquid residuum.

8. The process of claim 7 in which said aliphatic alcohol is methanol.

9. The process of claim 7 in which said aliphatic alcohol is ethanol.

References Cited in the file of this patent
UNITED STATES PATENTS

| | | |
|---|---|---|
| 2,547,726 | Trickey | Apr. 3, 1951 |
| 2,606,912 | Sifferd | Aug. 12, 1952 |
| 2,661,356 | Sifferd | Dec. 1, 1953 |